US007009498B2

(12) United States Patent
Lang et al.

(10) Patent No.: US 7,009,498 B2
(45) Date of Patent: Mar. 7, 2006

(54) MIRROR ARRANGEMENT FOR MOTOR VEHICLES

(75) Inventors: Heinrich Lang, Ergersheim (DE); Michael Witzke, Ansbach (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 494 days.

(21) Appl. No.: 10/091,211

(22) Filed: Mar. 5, 2002

(65) Prior Publication Data

US 2002/0154426 A1 Oct. 24, 2002

(30) Foreign Application Priority Data

Apr. 3, 2001 (DE) .......................... 201 05 791 U

(51) Int. Cl.
*B60Q 1/00* (2006.01)
*G02B 5/08* (2006.01)

(52) U.S. Cl. ............................ 340/425.5; 340/426.14; 340/825.72; 359/838; 362/494

(58) Field of Classification Search ........... 340/825.69, 340/825.72, 425.5, 426.13, 426.14, 426.15, 340/426.35, 426.36, 825.5, 10.1, 825.76; 359/838, 841; 362/494
See application file for complete search history.

(56) References Cited

U.S. PATENT DOCUMENTS

| | | | |
|---|---|---|---|
| 518,806 | A | 4/1894 | Dillmann |
| 809,698 | A | 1/1906 | Kelley |
| 1,528,082 | A | 3/1925 | Schlaich |
| 1,848,064 | A | 3/1932 | Oishei |
| 1,849,708 | A | 3/1932 | Colbert et al. |
| 1,908,767 | A | 5/1933 | Hodny |
| 2,060,401 | A | 11/1936 | Smith |
| 2,161,777 | A | 6/1939 | Sarnes |
| 2,166,303 | A | 7/1939 | Hodny et al. |
| 2,180,610 | A | 11/1939 | Rizt-Woller |
| 2,190,123 | A | 2/1940 | Pace |
| 2,263,382 | A | 11/1941 | Gotzinger |
| 2,511,971 | A | 6/1950 | Dalton |
| 2,561,582 | A | 7/1951 | Marbel |
| 2,580,014 | A | 12/1951 | Gazda |
| 2,595,331 | A | 5/1952 | Calihan et al. |
| 2,693,589 | A | 11/1954 | Hopkins |
| 2,836,818 | A | 5/1958 | Virgilis |
| 2,964,746 | A | 12/1960 | Trudnak, Jr. et al. |
| 3,040,207 | A | 6/1962 | Grontkowski |
| 3,052,787 | A | 9/1962 | Williams |
| 3,266,016 | A | 8/1966 | Maruyama et al. |
| 3,317,906 | A | 5/1967 | Baldridge |
| 3,346,229 | A | 10/1967 | Carson, Jr. |

(Continued)

FOREIGN PATENT DOCUMENTS

| | | |
|---|---|---|
| DE | 2826974 | 1/1980 |

(Continued)

OTHER PUBLICATIONS

AlliedSignal Bendix EC-14 *Antilock Controller Assembly Service Data*, publication SD-13-4784; *see*, e.g., pp. 1-5 © AlliedSignal Truck Brake Systems Co. Jan. 1999.

(Continued)

*Primary Examiner*—Donnie L. Crosland
(74) *Attorney, Agent, or Firm*—McNair Law Firm, P.A.; Cort Flint

(57) ABSTRACT

A mirror arrangement for a vehicle having a functional device, control apparatus, and a mode switch located in a mirror housing is provided. An activation device is provided to activate the mode switch for maintenance of the functional device. Various embodiments and related methods are also provided.

49 Claims, 5 Drawing Sheets

U.S. PATENT DOCUMENTS

| | | | |
|---|---|---|---|
| 3,375,053 | A | 3/1968 | Ward |
| 3,407,683 | A | 10/1968 | Liedel |
| 3,424,517 | A | 1/1969 | Budreck |
| 3,436,758 | A | 4/1969 | Kluth |
| 3,476,464 | A | 11/1969 | Clark |
| 3,532,871 | A | 10/1970 | Shipman |
| 3,574,283 | A | 4/1971 | Albers |
| 3,609,014 | A | 9/1971 | Kurz, Jr. |
| 3,659,929 | A | 5/1972 | Yuzawa |
| 3,665,392 | A | 5/1972 | Annas |
| 3,790,748 | A | 2/1974 | Van Laethen et al. |
| 3,840,851 | A | 10/1974 | Powler et al. |
| 3,916,549 | A | 11/1975 | Storch et al. |
| 3,936,158 | A | 2/1976 | Cianciolo et al. |
| 3,950,080 | A | 4/1976 | McKee et al. |
| 4,005,928 | A | 2/1977 | Kmetz et al. |
| 4,023,029 | A | 5/1977 | Fischer |
| 4,040,726 | A | 8/1977 | Paca |
| 4,071,736 | A | 1/1978 | Kamerling |
| 4,076,392 | A | 2/1978 | Suzuki et al. |
| 4,101,131 | A | 7/1978 | Barnby |
| 4,105,295 | A | 8/1978 | Skilliter, Jr. |
| 4,109,235 | A | 8/1978 | Bouthors |
| 4,174,823 | A | 11/1979 | Sutton et al. |
| 4,197,762 | A | 4/1980 | Yamana |
| 4,210,357 | A | 7/1980 | Adachi |
| 4,214,818 | A | 7/1980 | Choyke et al. |
| 4,229,992 | A | 10/1980 | McKee et al. |
| 4,241,290 | A | 12/1980 | Folland |
| 4,267,494 | A | 5/1981 | Matsuoka et al. |
| 4,274,078 | A | 6/1981 | Isobe et al. |
| 4,281,899 | A | 8/1981 | Oskam |
| 4,293,947 | A | 10/1981 | Brittain |
| 4,299,444 | A | 11/1981 | Römer |
| 4,348,556 | A | 9/1982 | Gettig et al. |
| 4,349,247 | A | 9/1982 | Koyama et al. |
| 4,403,829 | A | 9/1983 | Thujiuchi et al. |
| 4,410,790 | A | 10/1983 | Berg et al. |
| 4,443,057 | A | 4/1984 | Bauer et al. |
| 4,456,333 | A | 6/1984 | Hewitt |
| 4,463,411 | A | 7/1984 | Proctor |
| 4,464,017 | A | 8/1984 | Wada |
| 4,475,100 | A | 10/1984 | Duh |
| 4,479,175 | A | 10/1984 | Connor |
| 4,488,778 | A | 12/1984 | Polzer |
| 4,491,390 | A | 1/1985 | Tong-Shen |
| 4,499,451 | A | 2/1985 | Suzuki et al. |
| 4,506,954 | A | 3/1985 | Enomoto |
| 4,548,483 | A | 10/1985 | Moro et al. |
| 4,555,166 | A | 11/1985 | Enomoto |
| 4,572,626 | A | 2/1986 | Suzuki |
| 4,583,155 | A | 4/1986 | Hart |
| 4,588,267 | A | 5/1986 | Pastore |
| 4,603,946 | A | 8/1986 | Kato et al. |
| 4,609,265 | A | 9/1986 | McKee et al. |
| 4,613,791 | A | 9/1986 | Kurihara et al. |
| 4,623,222 | A | 11/1986 | Itoh et al. |
| 4,626,063 | A | 12/1986 | Honey |
| 4,626,967 | A | 12/1986 | Segoshi |
| 4,630,904 | A | 12/1986 | Pastore |
| 4,645,970 | A | 2/1987 | Murphy |
| 4,646,210 | A | 2/1987 | Skogler et al. |
| 4,659,967 | A | 4/1987 | Dahl |
| D289,989 | S | 5/1987 | Skogler et al. |
| 4,663,867 | A | 5/1987 | Nakagawa |
| 4,665,321 | A | 5/1987 | Chang et al. |
| 4,678,294 | A | 7/1987 | Van Nostrand |
| 4,678,295 | A | 7/1987 | Fisher |
| 4,679,158 | A | 7/1987 | Tate |
| 4,681,409 | A | 7/1987 | Enomoto |
| 4,682,294 | A | 7/1987 | Duc et al. |
| 4,692,000 | A | 9/1987 | Wada et al. |
| 4,693,571 | A | 9/1987 | Kimura et al. |
| 4,698,464 | A | 10/1987 | Tanaka et al. |
| 4,699,024 | A | 10/1987 | Iida et al. |
| 4,701,037 | A | 10/1987 | Bramer |
| 4,706,194 | A | 11/1987 | Webb et al. |
| RE32,576 | E | 1/1988 | Pastore |
| D293,903 | S | 1/1988 | Kolenda et al. |
| 4,733,336 | A | 3/1988 | Skogler et al. |
| 4,786,156 | A | 11/1988 | Kotani et al. |
| 4,787,726 | A | 11/1988 | Hendricks |
| 4,791,534 | A | 12/1988 | Lindberg |
| 4,793,690 | A | 12/1988 | Gahan et al. |
| 4,798,967 | A | 1/1989 | Yamana et al. |
| 4,799,768 | A | 1/1989 | Gahan |
| 4,816,662 | A | 3/1989 | Kyoden |
| 4,818,090 | A | 4/1989 | Righi |
| 4,833,376 | A | 5/1989 | Shimura |
| 4,837,552 | A | 6/1989 | Vandemotter et al. |
| 4,868,459 | A | 9/1989 | Dennerlein et al. |
| 4,878,038 | A | 10/1989 | Tsai |
| 4,882,565 | A | 11/1989 | Gallmeyer |
| 4,886,960 | A | 12/1989 | Molyneux et al. |
| 4,907,222 | A | 3/1990 | Slavik |
| 4,916,430 | A | 4/1990 | Vu et al. |
| 4,917,477 | A | 4/1990 | Bechtel et al. |
| 4,919,526 | A | 4/1990 | Umekawa et al. |
| 4,929,866 | A | 5/1990 | Murata et al. |
| 4,930,370 | A | 6/1990 | Yoshida |
| 4,935,665 | A | 6/1990 | Murata |
| 4,937,402 | A | 6/1990 | Kyoden |
| 4,940,322 | A | 7/1990 | Hamamoto et al. |
| 4,940,964 | A | 7/1990 | Dao |
| 4,942,571 | A | 7/1990 | Möller et al. |
| D315,710 | S | 3/1991 | Ropolo |
| 5,014,167 | A | 5/1991 | Roberts |
| 5,031,871 | A | 7/1991 | Ohta et al. |
| D320,591 | S | 10/1991 | Schmidt et al. |
| 5,056,905 | A | 10/1991 | Jensen |
| 5,060,905 | A | 10/1991 | Sharp |
| 5,093,768 | A | 3/1992 | Ohe |
| 5,097,362 | A | 3/1992 | Lynas |
| 5,110,196 | A | 5/1992 | Lang et al. |
| 5,126,885 | A | 6/1992 | Gray |
| 5,128,659 | A | 7/1992 | Roberts et al. |
| 5,132,851 | A | 7/1992 | Bomar et al. |
| 5,137,247 | A | 8/1992 | Lang et al. |
| 5,151,563 | A | 9/1992 | Tanaka |
| H1109 | H | 10/1992 | Roberts et al. |
| 5,165,772 | A | 11/1992 | Wu |
| 5,174,649 | A | 12/1992 | Alston |
| 5,194,789 | A | 3/1993 | Barrs |
| 5,196,965 | A | 3/1993 | Lang et al. |
| 5,207,492 | A | 5/1993 | Roberts |
| 5,211,466 | A | 5/1993 | Jarocki et al. |
| 5,227,924 | A | 7/1993 | Kerper |
| 5,240,438 | A | 8/1993 | Desranleau et al. |
| 5,241,457 | A | 8/1993 | Sasajima et al. |
| 5,249,083 | A | 9/1993 | Doughtie et al. |
| 5,253,115 | A | 10/1993 | Ueno |
| 5,274,505 | A | 12/1993 | Nagayama et al. |
| 5,285,060 | A | 2/1994 | Larson et al. |
| 5,289,321 | A | 2/1994 | Secor |
| 5,303,130 | A | 4/1994 | Wei et al. |
| 5,306,953 | A | 4/1994 | Weiner |
| 5,311,368 | A | 5/1994 | Tsuyama |
| 5,325,096 | A | 6/1994 | Pakett |
| 5,355,255 | A | 10/1994 | Assinder |
| 5,361,190 | A | 11/1994 | Roberts et al. |
| 5,363,246 | A | 11/1994 | Perry et al. |
| D353,795 | S | 12/1994 | Ayala |
| 5,371,659 | A | 12/1994 | Pastrick et al. |
| 5,388,035 | A | 2/1995 | Bodem, Jr. |

5,436,741 A 7/1995 Crandall
5,436,809 A 7/1995 Brassier et al.
5,438,487 A 8/1995 Schmid et al.
5,455,625 A 10/1995 Englander
5,477,391 A 12/1995 Boddy
5,491,470 A 2/1996 Veligdan
5,497,275 A 3/1996 Perry et al.
5,497,305 A 3/1996 Pastrick et al.
5,497,306 A 3/1996 Pastrick
5,508,689 A 4/1996 Rado et al.
5,521,588 A 5/1996 Kühner
5,530,240 A 6/1996 Larson et al.
5,574,443 A 11/1996 Hsieh
5,583,495 A 12/1996 Ben Lulu
5,583,703 A 12/1996 Lang et al.
5,587,699 A 12/1996 Faloon et al.
5,604,644 A 2/1997 Lang et al.
5,610,772 A 3/1997 Iizuka
5,615,054 A 3/1997 Lang et al.
5,621,577 A 4/1997 Lang et al.
5,625,502 A 4/1997 Hoogenboom et al.
5,627,688 A 5/1997 Valentino
5,631,638 A 5/1997 Kaspar et al.
5,642,106 A 6/1997 Hancock et al.
5,670,845 A 9/1997 Grant et al.
D385,243 S 10/1997 Lang
5,680,123 A 10/1997 Lee
5,684,337 A 11/1997 Wallace
5,684,646 A 11/1997 Boddy
5,687,035 A 11/1997 Lang
5,687,836 A 11/1997 Gjerde
D387,317 S 12/1997 Lang
5,696,776 A 12/1997 Spies et al.
5,699,044 A * 12/1997 Van Lente et al. .......... 340/525
5,703,732 A 12/1997 Boddy et al.
5,721,646 A 2/1998 Catlin et al.
5,731,558 A 3/1998 Kyoden
5,744,875 A 4/1998 Kleefeldt et al.
D394,833 S 6/1998 Muth
5,760,980 A 6/1998 Lang
5,781,354 A 7/1998 Sakata
5,786,772 A 7/1998 Schofield et al.
5,786,948 A 7/1998 Gold
5,788,357 A 8/1998 Muth et al.
5,793,171 A 8/1998 Hayashi et al.
5,793,420 A 8/1998 Schmidt
5,793,530 A 8/1998 Lang
5,798,882 A 8/1998 Lang
5,823,905 A 10/1998 Torii et al.
5,879,074 A 3/1999 Pastrick
5,880,895 A 3/1999 Lang et al.
5,896,235 A 4/1999 Valentino
D409,127 S 5/1999 Kim et al.
D409,540 S 5/1999 Muth
5,912,616 A 6/1999 Valentino
5,914,824 A 6/1999 Valentino
5,925,272 A 7/1999 Lang et al.
5,953,167 A 9/1999 Valentino
5,953,168 A 9/1999 Valentino
5,954,520 A 9/1999 Schmidt
5,963,127 A 10/1999 Lang et al.
5,978,017 A 11/1999 Tino
5,984,482 A 11/1999 Rumsey et al.
5,990,449 A 11/1999 Sugiyama et al.
6,006,143 A 12/1999 Bartel et al.
6,007,446 A 12/1999 Lang et al.
6,019,475 A 2/2000 Lynam et al.
6,030,084 A 2/2000 Schmidt
6,045,243 A 4/2000 Muth et al.
6,059,419 A 5/2000 Englander et al.
D427,127 S 6/2000 Horowitz
6,163,338 A 12/2000 Johnson et al.
6,174,062 B1 1/2001 Schillegger et al.
6,217,181 B1 4/2001 Lynam et al.
6,222,447 B1 4/2001 Schofield et al.

FOREIGN PATENT DOCUMENTS

DE 3412055 10/1985
DE 3614927 11/1987
DE 196 03 118 A 1 9/1996
DE 19902487 8/2000
DE 19904778 8/2000
DE 100 21 305 A 1 5/2003
EP 04 07 385 B1 1/1991
EP 0591743 4/1994
GB 1517601 7/1978
GB 2041589 9/1980

OTHER PUBLICATIONS

English language Abstract of DE 28 26 974 Derwent Info. Ltd. © 2002.

English language Abstract of DE 34 12 055 Derwent Info. Ltd. © 2002.

English language Abstract of DE 36 14 927 Derwent Info. Ltd. © 2002.

English language Abstract of DE 199 02 487 Derwent Info. Ltd. © 2002.

English language Abstract of DE 199 04 778 Derwent Info. Ltd. © 2002.

* cited by examiner

MIRROR ARRANGEMENT FOR MOTOR VEHICLES

FIELD OF THE INVENTION

The invention concerns a mirror arrangement for motor vehicles.

BACKGROUND OF THE INVENTION

Mirrors for motor vehicles, especially outside mirrors, are continually incorporating more electronic components, which serve, for example, for the control of positioning motors, for control display devices, and for sensors and the like. DE 199 04 778 A1 discloses, for example, an outside mirror for commercial vehicles, which, during driving in a curve, automatically compensates its position, so that a dead angle in such cases is avoided. The associated electronic components for this action are enclosed within the mirror housing.

Since the outside mirror is exposed to wind and weather, it is especially vital that these electronic components be protected against dampness within the housing. Accordingly, the electronic components in question and their wiring are advantageously encapsulated in a waterproof material; i.e., they are placed in a hermetically sealed encasement. If the individual components of the mirror need to be examined for maintenance purposes, it becomes necessary to reset the electronic components and their wiring to certain operational positions or states of circuitry. For this purpose, it is necessary to access the electronic components, which, in the present example, can only be done with considerable disassembly and/or demounting operations.

Electronic control apparatuses have been offered, for instance, in anti-locking systems, which are placed in the engine compartment or motor space apart from the outside mirror. These apparatuses exhibit a diagnostic window with a magnetically sensitive circuit. If a magnet is introduced in this area, then a reset is activated. The area of the diagnostic window in which the magnet sensitive circuit is to be found is designated with the legend "RESET".

BRIEF SUMMARY OF THE INVENTION

The present invention provides in one aspect a mirror arrangement for motor vehicles in which specific alterations of programs and methods of operation are more easily carried out. Another aspect of the present invention provides a system and a procedure for the execution of a specified program alteration or of a method of operation. This is to be carried out by a circuit and/or a control apparatus integrally incorporated in a mirror arrangement in which the component parts are simple, reliable, and economical to manufacture, assemble and use. Other advantages of the invention will be apparent from the following description and the attached drawings, or can be learned through practice of the invention.

Certainly it is within the present state of the technology to reset electronic wiring or control apparatuses by a magnetically sensitive switch or the like. However, on an outside mirror for vehicles, because of design reasons, no markings corresponding to the apparatuses, for example, are provided. Such markings are not necessarily required, since maintenance personnel know the locations behind the mirror housing or the mirror pane where the magnetic sensitive switches are found.

With the provision of at least one magnetically activated switch to achieve a defined circuit condition or establish an operational mode in the electronic circuit and/or control apparatus in the mirror housing, the desired operational mode, or the condition of the circuit, can be achieved by a magnet of appropriate strength from outside of the mirror housing without any demounting. This considerably simplifies maintenance work, since no disassembly is necessary for the inspection of the equipment.

In accord with an advantageous embodiment of the invention, this activation is carried out by permanent magnets. These permanent magnets can be made simply and economically and adjusted to a specified strength.

In accord with another advantageous embodiment of the invention, an operational-mode switch is placed directly behind the mirror pane or directly on the inside of the housing. Because of this placement, this switch can specifically be activated, since the activating magnet can be held on a corresponding position on the outside of the housing or on the corresponding position on the outside of the mirror pane.

In accord with another advantageous embodiment of the invention, the at least one operational-mode switch can also be discretely activated by a multiplicity of magnetic impulses, which can be generated by appropriate control of an electromagnet. Accordingly, a chance activation of the operational-mode switch is avoided.

In accord with yet another advantageous embodiment of the invention, the mirror arrangement encompasses a display device, which indicates optically, acoustically, or in some other manner if the respective operational-mode switch has been activated by a magnet.

In accord with a further advantageous embodiment of the invention, the display device is an optical display device, which is specially integrated into the mirror pane. An example of such a device is disclosed by DE 199 02 487 A1. The optical display device of this disclosure is placed behind the mirror pane and is only visible when it is activated. Additionally, the optical display can be employed for other purposes, which are outlined in DE 199 02 487 A1 along with the other details of this display.

In accord with a further advantageous embodiment of the invention, the electronic control apparatus encompasses computer equipment and a memory storage device in which appropriate software is loaded. The magnet-sensitive operational-mode switch or test program can be activated by the software; e.g., the brilliance of an optical display built into the mirror pane can be suitably adjusted.

In accord with yet another advantageous embodiment of the invention, a multiplicity of operational-mode switches is provided. The operational-mode switches are placed at different places in the interior of the mirror housing or on the inside of the mirror pane. Activation of the various operational-mode switches serves to activate different functions of the electronic controls or to set different test programs in motion.

A system and procedure according to another aspect of the invention ensures that the magnet will be placed precisely on the correct position. Specifically, a template with position markings avoids misplacements and positioning errors, especially in the case of a multiplicity of operational-mode switches.

In another aspect of the invention, the template is configured to be placed in a defined manner on the mirror assembly without requiring additional markings on the surface of the mirror and housing. The shape of the mirror pane, together with the legend "Top" and/or "Bottom" on the template, provide an error free indication of the position of the template on the mirror arrangement.

In accord with yet another advantageous embodiment of the invention, the markings on the marked-up template are printed so that it is immediately evident which function is called up by the corresponding marking for the particular operational-mode switch. Accordingly, erroneous services are avoided.

BRIEF DESCRIPTION OF THE DRAWINGS

Further details, features and advantages of the invention are evident from the following detailed description, as seen with the aid of the accompanying drawings in which there is shown in.

DETAILED DESCRIPTION OF THE INVENTION

Figure 1:
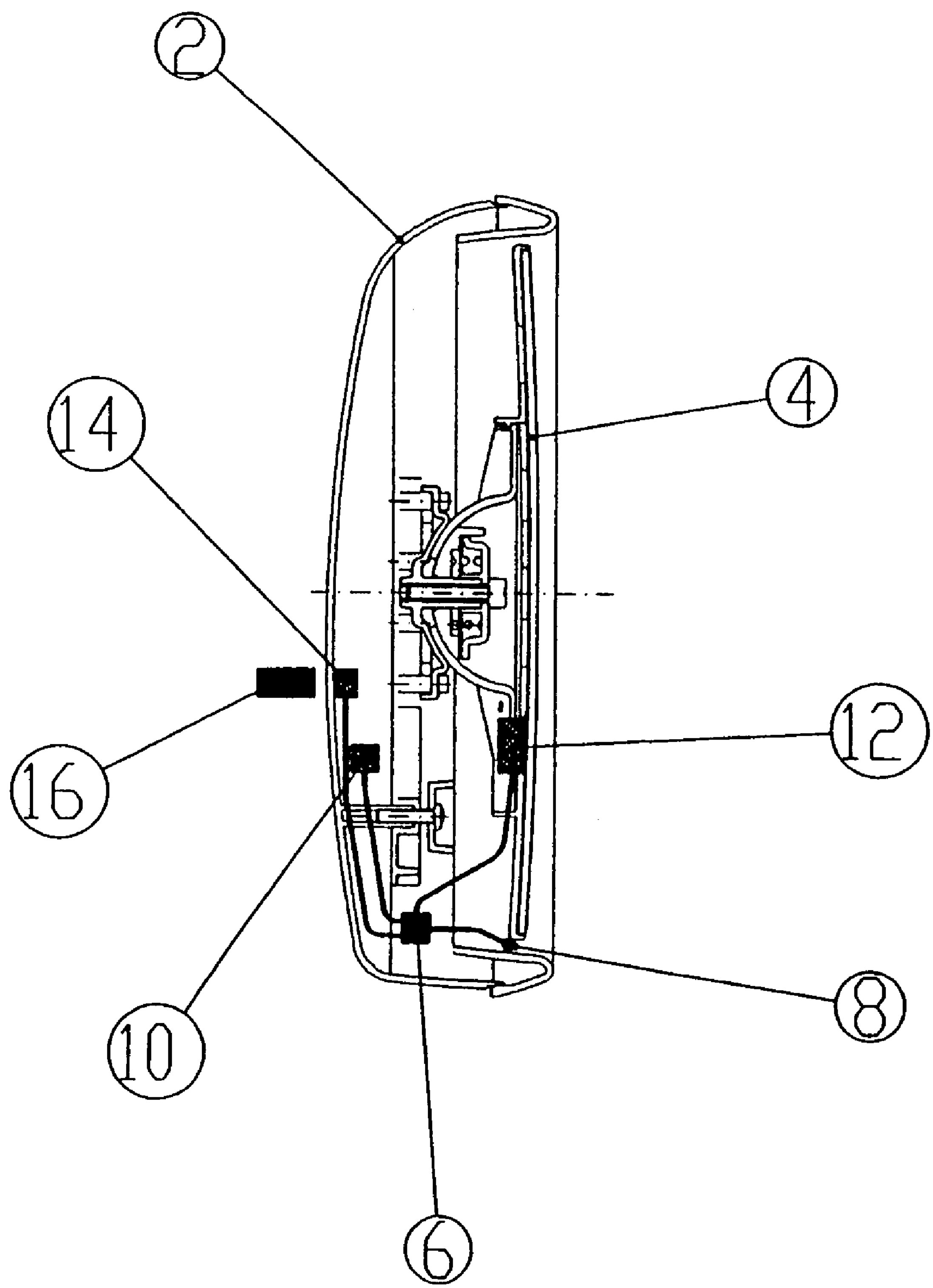
FIG. 1 a schematic sectional view of a first embodiment.

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

FIG. 1 shows schematically a first embodiment of the invented mirror arrangement with a mirror housing 2 attached to a vehicle V, a mirror pane 4 placed in the mirror housing 2, and an electronic control device 6, which is placed in the interior of the mirror housing 2. The electronic control device 6 serves for the control of an optical display device 8, for the control of a gyro-device 10 for the automatic positioning of the mirror pane 4 when driving in curves and for the control of a mirror adjustment 12 for displacement of the mirror 4 in accord with positioning signals generated by switches (not shown) or for adjusting the mirror 4 via signals from the gyro-device 10.

In the interior of the mirror housing 2 at a specific position remote from the mirror pane 4, a magnetically activated operational-mode switch 14 is located. This switch 14 can be energized by an activating magnet in the form of a permanent magnet 16. This permanent magnet 16 is situated in an area on the outside of the mirror housing 2 proximate the inner side of the mirror housing 2 where the operational-mode switch 14 is positioned. The operational-mode switch 14 can be magnetically activated to energize certain circuit conditions or methods of operation in the control apparatus 6. For instance, by the activation of the operational-mode switch 14, the electronic control apparatus 6 can illuminate the optical display device 8, or the entire displacement zone of the mirror pane 4 can be scanned. In this manner, without demounting a single component, proper functioning (or malfunctioning) of the functional elements assembled in the mirror housing; e.g., the optical display device 8, the gyro-device 10, the mirror positioning apparatus 12 and even the control apparatus 6, can be examined.

Figure 2:
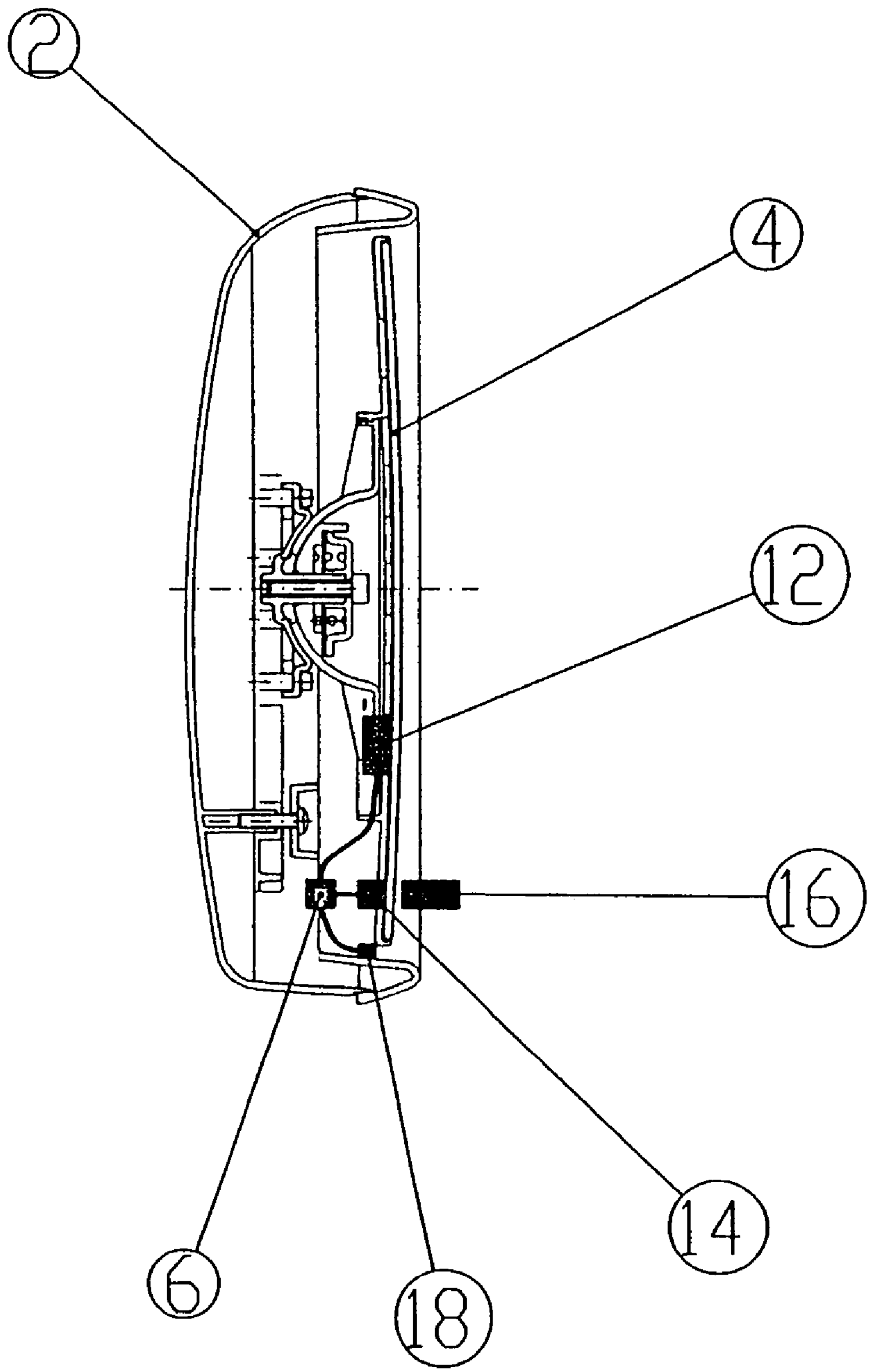
FIG. 2 a schematic sectional view of a second embodiment.

FIG. 2 shows a second embodiment in which the electronic control apparatus 6 controls not only the mirror positioning apparatus 12, but also a temperature sensor 18. The operational-mode switch 14 is, in this aspect, placed on the back side of the mirror pane 4 and can be activated by positioning the activation magnet 16, which is on the forward side of the mirror pane 4.

Figure 3:
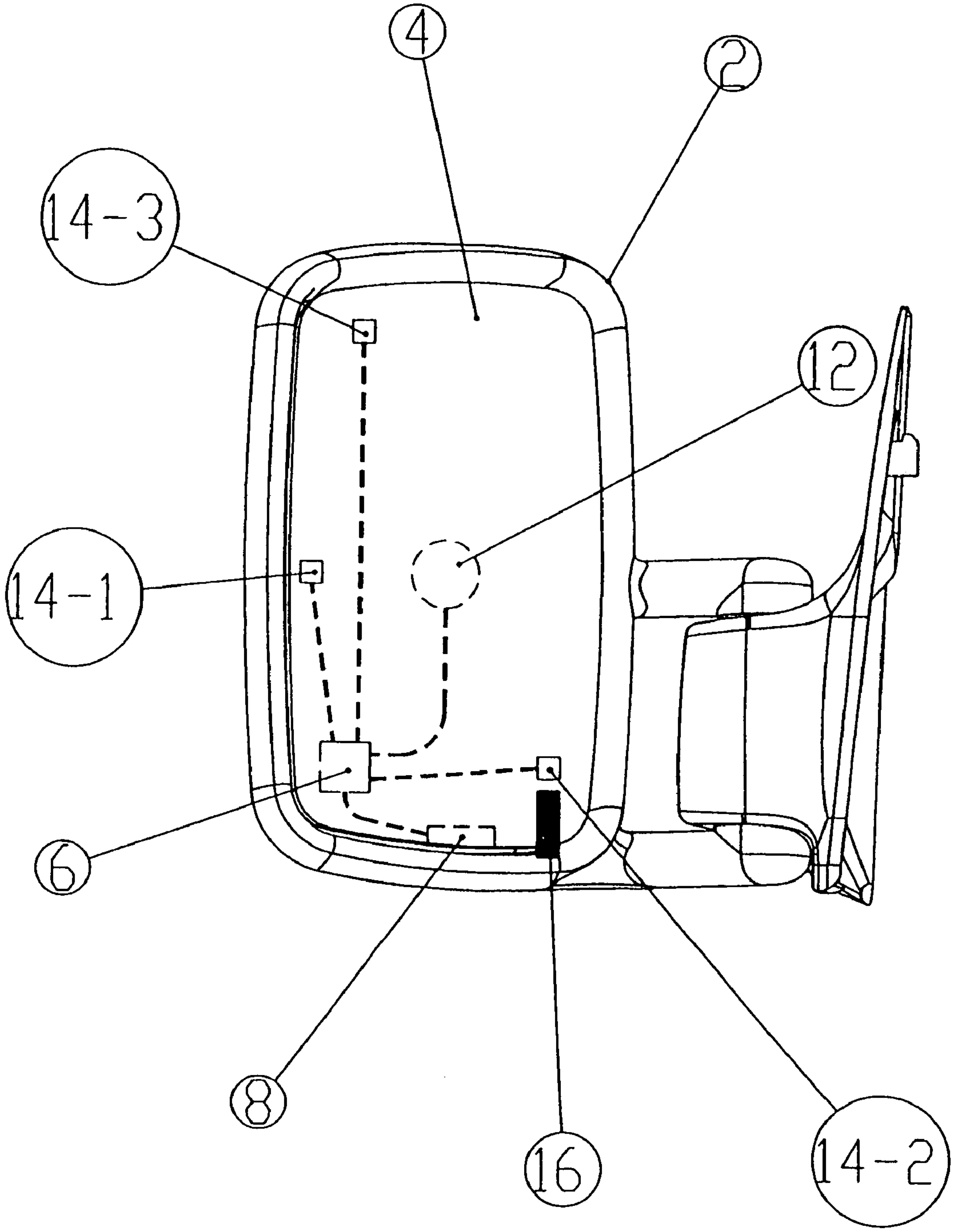
FIG. 3 a schematic front view of a third embodiment.

FIG. 3 shows a third embodiment of the invention in which a multiplicity of operational-mode switches 14-1, 14-2, and 14-3 (collectively, 14-i) are located on the rear side of the mirror pane 4. By activation of the various operational-mode switches 14-i, various circuit effects or methods of operation may be achieved. It is possible, for instance, that with the operational-mode switch 14-1, a testing or diagnostic program for the mirror positioning apparatus 12 can be enabled, while the operational-mode switch 14-2 can be utilized to activate a test program for the optical display device 8. With regard to the operational-mode switch 14-3, the circuit and/or the control apparatuses can be reset.

Figure 4:
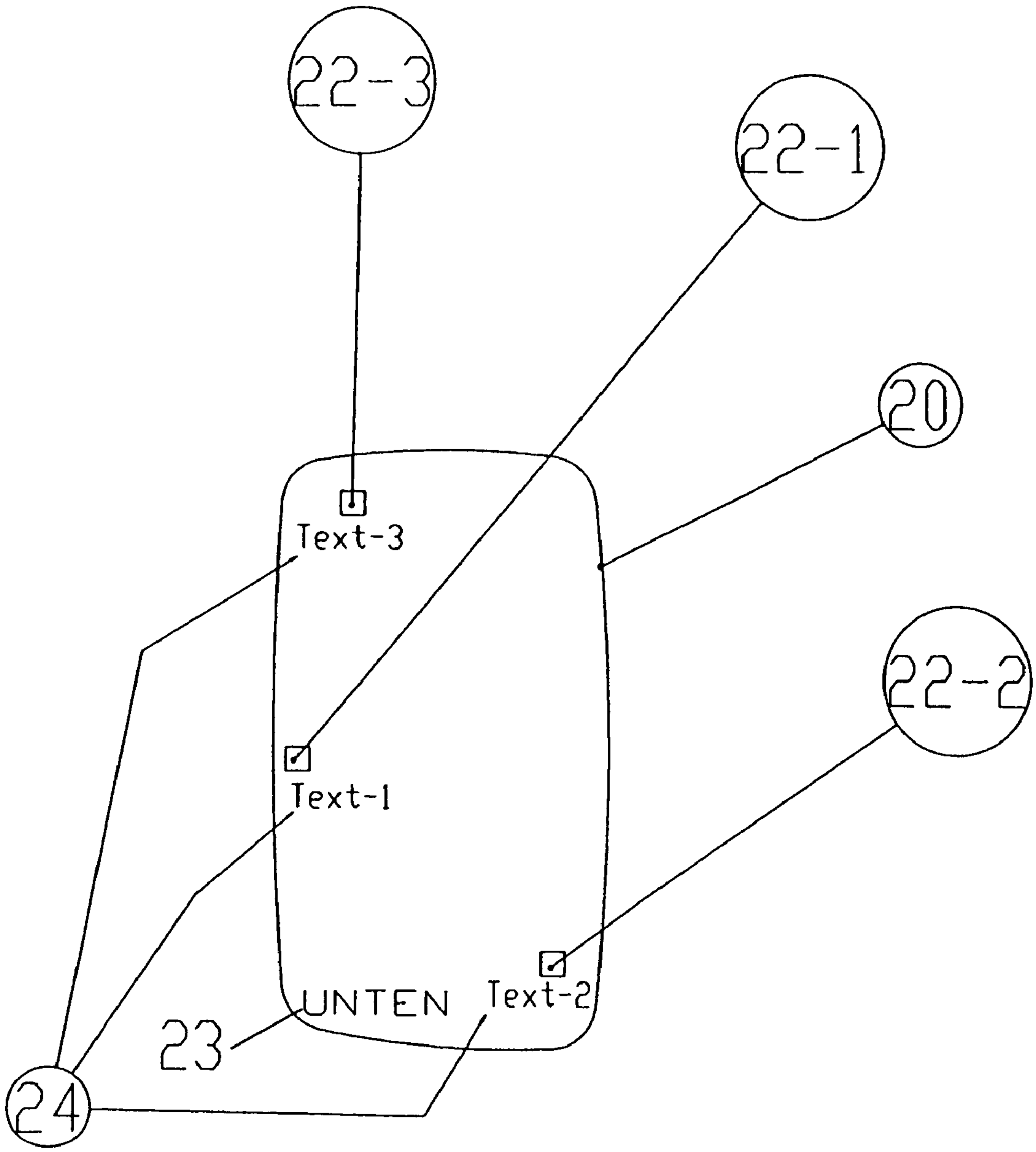
FIG. 4 a schematic front view of a marking template for the embodiment in accord with FIG. 3, and FIG. 5 a schematic front view of the marking template for an embodiment in which an operational-mode switch is located on an inside of a mirror housing.

In order to avoid a visible marking of the position of the operation-modus switch 14-i behind the mirror pane 4 on the forward side of the mirror pane 4, a marking template 20 has been made, which is shown in FIG. 4. The marking template 20 possesses the outer form of the mirror pane 4 and it outlines indicators or markings 22-i (corresponding collectively to markings 22-1, 22-2, and 22-3, for example), which furnish the individual positions of the operational-mode switch 14-i behind the mirror pane 4. Additionally, this template 20 includes a legend that signifies which circuit condition or which method of operation is activated with the respective operational-mode switch 14-i at the position in question. Moreover, the legend "Bottom" 23, may be provided to ensure that the marking template 20 has been laid on the mirror pane 4 in the correct orientation. Other legends having different placements on the template 20 and different wording are also contemplated to positively orient the marking template 20. Accordingly, in case of maintenance work, the marking template 20 is employed by the maintenance personnel to ensure that the activation magnet 16 is positioned at the correct location.

Figure 5:
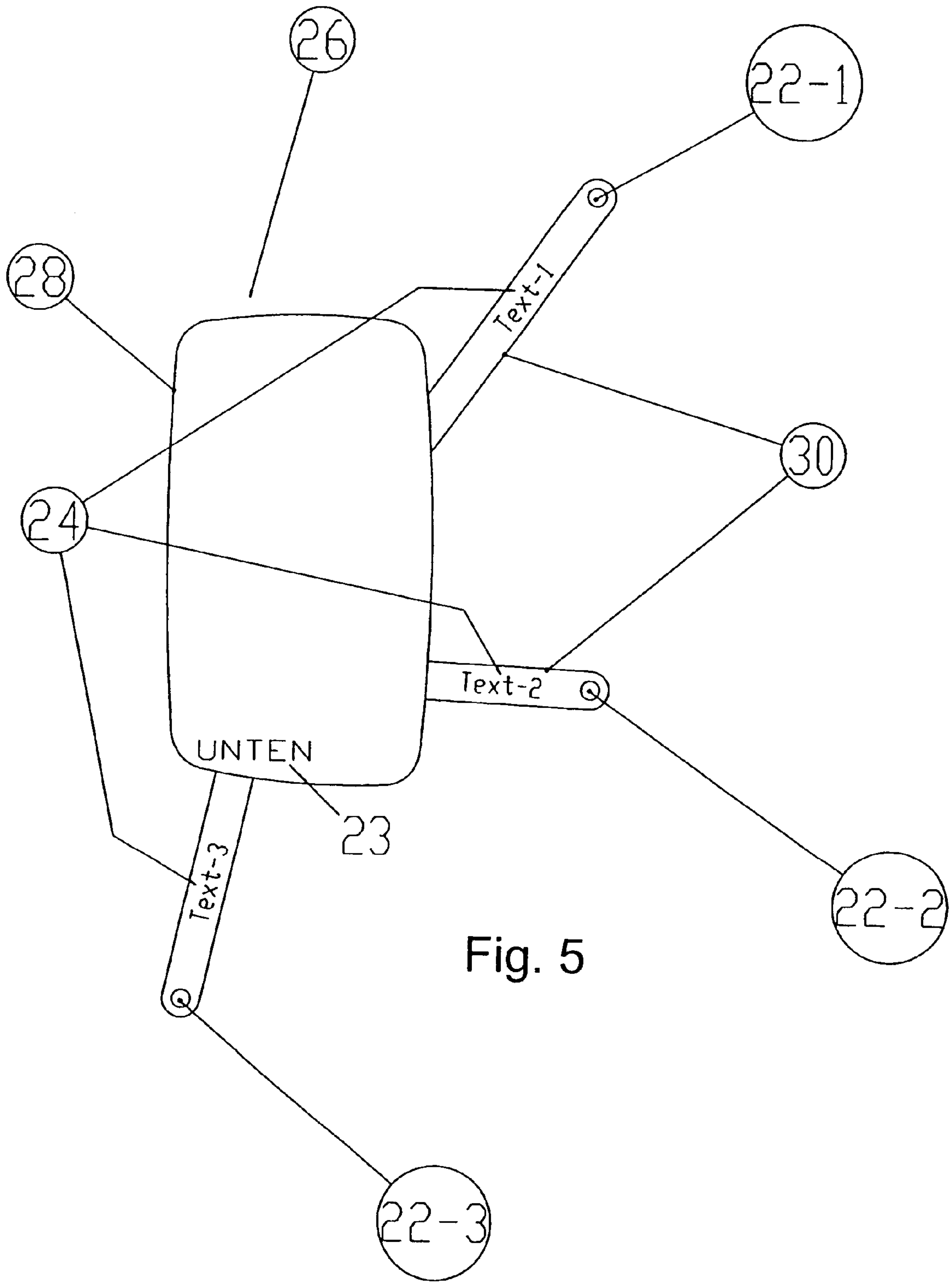

FIG. 5 shows a variant of a marking template 26, which is appropriate for such an embodiment in which the operational-mode switch 14-i is placed on the inner side of the mirror housing 2, such as in the case of the embodiment shown in FIG. 1. The marking template 26 encompasses a principal part 28 with elongated members 30 extending therefrom. The legends 22-i for the operational-mode switch 14-i are written on the elongated members 30, which extend from the principal part 28. Likewise on the elongated members 30, the legends 24 are impressed to provide information as to which function the respective operational-mode switch 14-i has. The principal part 28 is preferably rigid and is made, for instance, of cardboard and adapted to the shape of the mirror pane 4. The elongated members 30, on the other hand, are flexible and allow themselves to be folded up.

By way of example operation, upon laying the principal part 28 in the proper orientation in accord with the label "Bottom" 23, and wrapping the flexible, extended members 30 around the housing 2, the elongated members 30 are laid in close contact on the outside of housing 2. The markings 22-i then provide the exact location of the operational-mode switch 14-i on the inside of the mirror housing 2. This method provides in a clear and unambiguous way the position and the function of the individual operational-mode switch 14-i to maintenance personnel.

Alternatively, it is possible to install operational-mode switches 14-i on both the rear side of the mirror pane 4 as well as in the interior of the mirror housing 2. In this case, where the marking template 26 is concerned, legends 24 and markings 22-i are placed on the principal part 28.

It will be apparent to those skilled in the art that various modifications and variations can be made in the present invention without departing from the scope and spirit of the invention. For example, specific shapes of various elements of the illustrated embodiments may be altered to suit particular vehicles or other environments and applications. It is intended that the present invention include such modifications and variations as come within the scope of the appended claims and their equivalents.

The invention claimed is:

1. A mirror arrangement affixable to a vehicle comprising:
- a mirror housing with a mirror pane;
- a functional device disposed in the mirror housing, the functional device configured to change a presentation of the mirror pane;
- a control apparatus disposed in the mirror housing, the control apparatus in communication with the functional device; and
- a mode switch disposed in the housing in communication with the control apparatus, the mode switch configured to be magnetically activated by a magnetic activation device, the activated mode switch and control apparatus cooperable to effect at least one operational mode of the functional device.

2. The mirror arrangement of claim 1, wherein the functional device is a plurality of functional devices selected from the group consisting of an optical display device, a gyroscopic device, a mirror positioning apparatus, a temperature sensor, and combinations thereof.

3. The mirror arrangement of claim 2, wherein the optical display device is integrated in the mirror pane, the optical display device configured to be visible when activated by the mode switch via the control apparatus.

4. The mirror arrangement of claim 1, wherein the control apparatus is a computer, the computer configured to act as an interface between the functional device and the mode switch, the computer having at least one software program stored therein to activate the at least one operational mode when activated by the mode switch.

5. The mirror arrangement of claim 1, wherein the mode switch activates a diagnostic program to test the functional device.

6. The mirror arrangement of claim 5, wherein the mode switch is a plurality of mode switches.

7. The mirror arrangement of claim 6, wherein at least one of the mode switches is configured to selectively test the at least one operational mode.

8. The mirror arrangement of claim 6, wherein the plurality of mode switches are disposed apart from each other in the housing such that the activation device selectively and separately activates the plurality of mode switches.

9. The mirror arrangement of claim 1, wherein the mode switch is located on an interior of the housing.

10. The mirror arrangement of claim 1, wherein the mode switch is located proximate the mirror pane.

11. The mirror arrangement of claim 1, wherein the activation device is disposed externally apart from the housing.

12. The mirror arrangement of claim 1, wherein the activation device is a permanent magnet, the permanent magnet configured to activate the mode switch from a position proximate the mode switch.

13. The mirror arrangement of claim 1, wherein the activation device activates the mode switch by a coded magnetic impulse, the impulse configured to initiate a discrete operation of the at least one operational mode.

14. The mirror arrangement of claim 1, further comprising a marking template having at least one indicator such that when the marking template is positioned proximate the mirror pane, the indicator indicates a position of the mode switch.

15. The mirror arrangement of claim 14, wherein the mirror pane has at least one shaped area and the marking template has at least one complementary shaped area such that the marking template can be oriented positively on the mirror pane to indicate the position of the mode switch.

16. The mirror arrangement of claim 14, wherein the marking template defines a label indicating a positive orientation of the marking template relative to the mirror pane.

17. The mirror arrangement of claim 14, wherein the mode switch is disposed proximate an interior of the mirror housing away from the mirror pane, the marking template defining a flexible extension configured to wrap about a portion of an exterior of the housing to indicate the position of the mode switch when the marking plate is positioned proximate the mirror pane.

18. The mirror arrangement of claim 17, wherein the flexible extension defines the at least one indicator and a legend thereon signifying a function of the mode switch.

19. The mirror arrangement of claim 14, wherein the marking template defines a plurality of indicators and a plurality of extensions having a plurality of legends thereon to signify a plurality of functions of a plurality of mode switches.

20. A service kit for a vehicle mirror assembly having a housing defining an exterior and an interior, a control apparatus, at least one functional device, and a mode switch disposed in the interior, and a mirror pane attached to the exterior, the service kit comprising:
- a template configured to be removably positioned proximate the mirror pane to mark externally a position of the mode switch;
- an activation device configured to selectively activate the mode switch, the mode switch in electronic communication with the control apparatus and configured to activate a software program in the control apparatus to effect a discrete mode of operation by the at least one functional device.

21. The service kit of claim 20, wherein the mode switch is disposed proximate the mirror pane, the template configured to complement a shape of the mirror pane to indicate the position of the mode switch proximate the mirror pane.

22. The service kit of claim 21, wherein the template has a legend disposed thereon to signify a function of the mode switch.

23. The service kit of claim 20, wherein the mode switch is disposed in the interior apart from the mirror pane, the template having at least one flexible extension configured to wrap about an exterior portion of the housing to indicate the position of the mode switch.

24. The service kit of claim 23, wherein the template is cardboard.

25. The service kit of claim 20, wherein the control apparatus is a computer having a program responsive to a coded signal to selectively activate the mode switch, the activation device configured to deliver the coded signal to activate the at least one functional device.

26. The service kit of claim 25, wherein the activation device is a permanent magnet and the coded signal is a pulsed magnetic signal.

27. A method of diagnostically servicing a vehicle mirror assembly having a mirror housing with at least one mirror pane, the method comprising the steps of:

a) providing an activation device configured to selectively activate from external the mirror housing a mode switch disposed in the mirror housing, the mode switch in communication with a control apparatus configured to activate a mode of operation of a functional device disposed in the mirror housing;

b) providing an indicator template to indicate a position of the mode switch, the indicator template defining a complementary shape to a shape of the at least one mirror pane for positive external placement proximate the at least one mirror pane;

c) positioning the indicator template proximate the at least one mirror pane to indicate the position of the mode switch;

d) ascertaining the mode of operation of the mode switch from a legend disposed on the indicator template;

e) programming an activation signal of the activation device to correspond to the ascertained mode of operation;

f) positioning the activation device proximate the mode switch as indicated by the indicator template; and g) delivering the activation signal from the activation device to the mode switch to activate the mode of operation of the functional device for a diagnostic service.

28. The method of claim 27, further comprising the steps of:

performing the diagnostic service on the functional device during the activated mode of operation;

setting a reset signal in the activation device upon completion of the diagnostic service; and delivering the reset signal from the activation device to the mode switch to return the functional device to a state in step a.

29. The method of claim 28, further comprising the step of removing the indicator template from proximate the at least one mirror.

30. The method of claim 27, wherein the indicator template has at least one extension having a mark disposed thereon to indicate the mode switch disposed in the mirror housing away from the at least one mirror pane.

31. The method of claim 30, further comprising the substep of wrapping the at least one extension about an external portion of the mirror housing to indicate the mode switch before step d.

32. The method of claim 27, wherein the activation device is a permanent magnet configured to deliver the activation signal as a coded magnetic pulse.

33. A method of diagnostically servicing a vehicle mirror assembly having a mirror housing with a plurality of mirror panes, the method comprising the steps of:

a) providing a magnetic activation device configured to selectively activate from external the mirror housing a plurality of mode switches disposed in the mirror housing;

b) providing an indicator template configured for placement proximate the plurality of mirror panes, the indicator template defining a plurality of complementary shapes corresponding to the plurality of mirror panes;

c) placing the indicator template proximate the plurality of mirror panes to indicate a plurality of positions corresponding to the plurality of mode switches; and d) selectively activating at least one of the mode switches to effect an operation of a functional device disposed in the mirror housing.

34. The method of claim 33, further comprising the substep of resetting the at least one activated mode switch.

35. The method of claim 33, wherein the indicator template is unitarily constructed.

36. The method of claim 35, wherein the indicator template is a plurality of individual indicator templates.

37. The method of claim 33, wherein the activation device selectively activates the at least one mode switch via a coded magnetic pulse, the at least one mode switch configured to communicate the pulse to a control apparatus to effect the operation of the functional device.

38. A mirror arrangement for a vehicle comprising:

a mirror housing with a mirror pane and a functional device disposed in the mirror housing, the functional device configured to change a presentation of the mirror pane; and a magnetic activation device configured for placement proximate the mirror housing to effect at least one operational mode of the functional device.

39. The mirror arrangement of claim 38, further comprising a control apparatus with a mode switch disposed in the mirror housing, the control apparatus in communication with the functional device, the mode switch configured to be magnetically activated by the magnetic activation device, the magnetically activated mode switch cooperable with the control apparatus to effect at least one operational mode of the functional device.

40. The mirror arrangement of claim 38, wherein the functional device is a plurality of functional devices selected from the group consisting of an optical display device, a gyroscopic device, a mirror positioning apparatus, a temperature sensor, and combinations thereof.

41. The mirror arrangement of claim 38, wherein the mode switch activates a diagnostic program to test the functional device.

42. The mirror arrangement of claim 38, wherein the magnetic activation device is disposed externally apart from the mirror housing.

43. The mirror arrangement of claim 38, wherein the magnetic activation device activates the mode switch by a coded magnetic impulse, the impulse configured to initiate a discrete operation of the at least one operational mode.

44. The mirror arrangement of claim 38, further comprising a marking template having at least one indicator such that when the marking template is positioned proximate the mirror pane, the indicator indicates a position of the mode switch.

45. A method of servicing a vehicle mirror assembly comprising the steps of:

a) providing a mirror housing with a mirror pane;

b) providing a magnetic activation device configured to selectively activate a mode switch disposed in the mirror housing, the magnetic activation device operable from external the mirror housing;

c) placing the magnetic activation device proximate the mirror housing to selectively activate the mode switch; and d) activating a mode of operation of a functional device disposed in the mirror housing, the mode of operation configured for a diagnostic service.

46. The method of claim 45, further comprising the substep of providing an indicator template to indicate a position of the mode switch, the indicator template defining a complimentary shape relative to a shape of the mirror pane for positive placement of the indicator template proximate the mirror pane.

47. The method as in claim 46, wherein the indicator template has at least one extension having a mark disposed thereon to indicate the mode switch disposed in the mirror housing.

48. The method as in claim 47, further comprising the substep of programming an activation signal in the activation device to correspond to a selected mode of operation.

49. The method as in claim 48, further comprising the substep of positioning the activation device proximate the mode switch as indicated by the indicator template.

* * * * *